United States Patent [19]

Rozek

[11] Patent Number: 4,565,350
[45] Date of Patent: Jan. 21, 1986

[54] HANDLE ASSEMBLY

[75] Inventor: Roy J. Rozek, Plymouth, Wis.

[73] Assignee: Kohler Co., Kohler, Wis.

[21] Appl. No.: 688,342

[22] Filed: Jan. 2, 1985

[51] Int. Cl.[4] .............................................. F16K 31/60
[52] U.S. Cl. ...................................... 251/292; 251/291;
  16/114 R; 16/121; 16/DIG. 24; 16/DIG. 30;
  74/553; 292/19; 292/352; 292/353; 292/DIG.
  4; 403/16; 403/17; 403/361
[58] Field of Search ............. 251/291, 292; 16/114 R,
  16/118, 121, DIG. 24, DIG. 30; 74/553;
  292/19, 352, 353, DIG. 4; 403/16, 17, 299, 361

[56] References Cited

U.S. PATENT DOCUMENTS

| | | | |
|---|---|---|---|
| 1,563,351 | 12/1925 | Field et al. | 16/121 X |
| 1,947,282 | 2/1934 | Theis | 292/347 |
| 3,039,802 | 6/1962 | Barry | 292/19 |
| 3,100,404 | 8/1963 | Boeddeker et al. | 74/553 |
| 3,602,539 | 8/1971 | James | 292/353 |
| 4,421,349 | 12/1983 | Greiert, Jr. | 292/19 |

Primary Examiner—Samuel Scott
Assistant Examiner—Allen J. Flanigan
Attorney, Agent, or Firm—Quarles & Brady

[57] ABSTRACT

A handle assembly for attaching a decorative handle to a turning stem is disclosed. The handle can be placed on, as well as removed from the stem by a straight axial motion (without turning the handle). In one embodiment, the stem adapter is secured to a valve stem and has an angled shoulder surface and an undercut portion. An attachment screw is employed to secure the stem adapter to the valve stem. The handle adapter has a multiplicity of resilient finger members with terminal portions adapted to engage both the angled shoulder surface and the undercut portion of the stem adapter. A handle member of a generally U-shaped configuration has a retainer member secured therein with the retainer member having finger engaging portions. The engaging portions are arranged so that in conjunction with the stem adapter they hold the resilient finger portions away from the undercut portion of the stem adapter in one position of the handle member, yet permit placement of the finger portions in the undercut portion and in engagement with the shoulder surface in another position. In the third position the finger portions will be moved away from the undercut portion and shoulder surface. In a final position, the resilient finger portions with the finger engaging portions of the retainer member will abut against the stem adapter for reinstallation.

19 Claims, 14 Drawing Figures

HANDLE ASSEMBLY

BACKGROUND OF THE INVENTION

This invention relates to decorative handles which are attachable to rotatable stems. It appears to be most suitable for a plumbing valve handle which does not have a visible attachment device. More particularly, it resides in a valve handle assembly which can be installed and removed by merely moving the handle in a linear manner in predetermined steps over the valve stem.

There are currently available several types of decorative handles wherein the typical exposed screw (or screw and screw cap) for attaching the handle to the valve stem is eliminated. For example, there is U.S. Pat. No. 4,306,468 which is commonly assigned to the assignee of this invention.

Some of the foregoing described units are fabricated from a multiplicity of parts or are units which require involved production steps in their fabrication or close tolerance detail. Further, such units often require a rotation step for disassembly or assembly which can take up costly time, and/or can cause confusion to non-skilled plumbers.

It is an advantage of the present invention to provide a decorative handle assembly in which the handle may be attached to a valve stem without requiring a screw hole or other attachment mechanism passing through the handle exterior. Another advantage is in providing a handle assembly of the above kind in which the handle may be readily attached and removed with a minimum amount of effort and manipulation. Other advantages are the handle assembly of the above kind in which the handle assembly is manufactured with a minimum number of component parts and wherein close tolerances are not required between the parts. This results in a handle assembly which can be manufactured and installed in an economical manner.

SUMMARY OF THE INVENTION

The foregoing advantages are accomplished and the shortcomings of the prior art are overcome by the present handle assembly. The handle assembly includes a stem adapter which fits over a rotatable stem such as a valve stem and is fixed axially relative thereto as well as to rotate therewith. The stem adapter has an angled shoulder or peripheral cam surface, and an undercut catch portion spaced therefrom.

A handle adapter fits over the stem adapter and has at least one resilient finger member with terminal portions adapted to engage both the angled shoulder and the undercut portion of the stem adapter. A handle member houses a retainer member which is mounted in the handle to rotate therewith. Means are provided for resilient camming engagement between the handle adapter, the stem adapter and retainer member, whereby the handle may be fixed against outward movement relative to the stem adapter and then unfixed against outward movement relative to the stem adapter by sequential inward movement of the handle to a locking position, followed by further inward movement of the handle to a releasing position, followed by outward movement of the handle to remove it from the stem adapter.

Stated more specifically, the retainer member has engaging portions to engage the resilient finger portions of the handle adapter, and push the finger engaging portions into the undercut (which is the locking position). The finger engaging portions will then move the finger portions over and off the shoulder surface and out of the undercut portion to a retaining position, so as to permit removal of the handle from the valve stem. The handle assembly also permits reinstallation due to the finger portions pressing against the finger engaging portions so that the latter will abut against the stem adapter (yet will allow the finger portions to be stripped therefrom and slide over the stem adapter to again engage the undercut).

In a preferred manner, the first and second finger engaging parts are defined by concentrically positioned annular members with the inner annular member having a longer dimension than the outer annular member. Also preferably, a plurality of resilient finger members are present in the handle adapter having a generally "L" shaped configuration, and the undercut and the shoulder surfaces of the stem adapter are formed by a contiguous surface with the finger members having end surfaces matching the shoulder surface and the undercut portion.

In the detailed description which follows, the preferred embodiments of the invention will be described with reference to the accompanying drawings. These embodiments do not represent the full scope of the invention. Rather the invention may be employed in still other embodiments. Reference should be made to the claims herein for interpreting the breadth of the invention.

DESCRIPTION OF THE PREFERRED EMBODIMENTS

Proceeding to a detailed description of the preferred embodiments of the invention, the valve handle assembly generally (10) is shown in FIGS. 1-8 at various stages of assembly and disassembly. It is designed for use in conjunction with the usual valve stem 11, to which is secured a stem adapter 12 by the usual screw 13.

Figure 11:
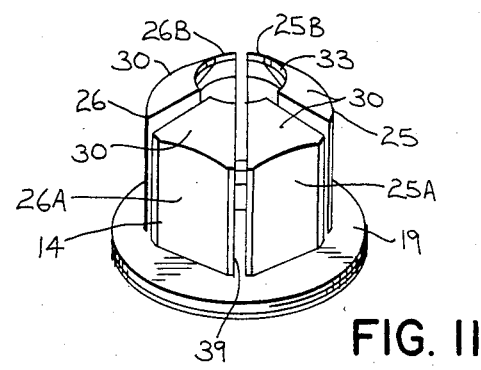
FIG. 11 is a top perspective view of the handle adapter which also forms a portion of the handle assembly.

As best seen in FIG. 11, a handle adapter 14 includes six resilient finger members 25, 25A, 25B, 26, 26A and 26B. They surround and frictionally engage the periphery of stem adapter 12 so that a rotational force can be imparted to the valve stem when the valve handle assembly is in the assembled position indicated in FIG. 2.

It will be noted that the handle adapter 14 has a threaded flange 19 for threadable engagement with the internal threads 20 in the skirt portion 18 of the handle 15. A top or end portion 17 also forms a portion of the handle 15 to result in a U-shaped cross section for the handle 15 with a cavity 58. The usual escutcheon 22 is threadably received over the threads 21 on the valve stem 11 for contact with a lavatory top (not shown).

Figure 4:
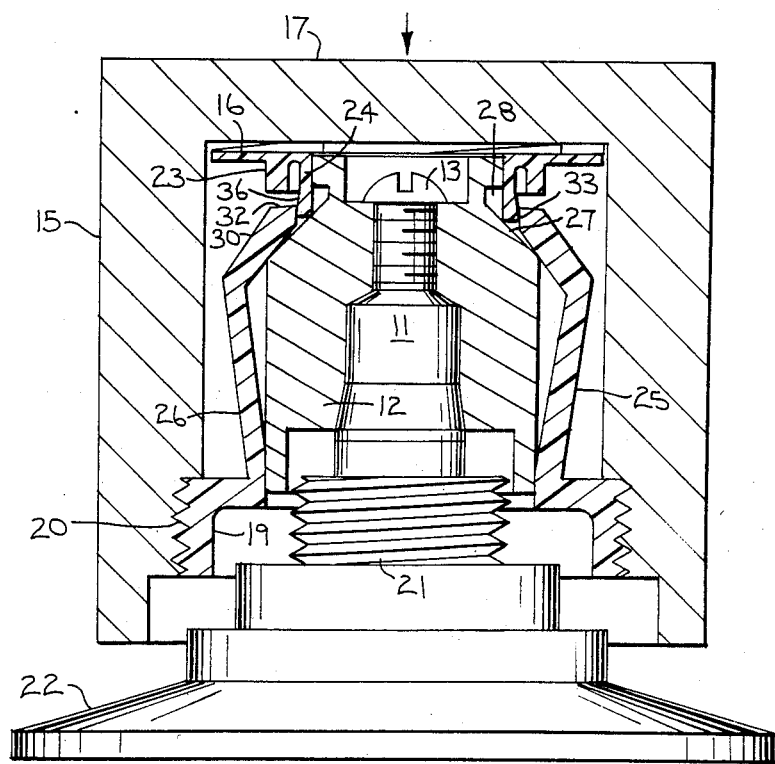
FIG. 4 is a view similar to FIG. 1, except showing the valve handle assembly in its next stage of removal.

A retainer member 16 includes an outer annular engaging part or ring 23, and an inner engaging part 24 separated by slots 38. Both such parts are for engagement with the resilient finger members (e.g. 25 and 26) and specifically their end portions 30. This engagement feature of the invention will be further described below. The end portions 30 of the resilient finger members 25 and 26 are best indicated in FIG. 4 with end surfaces 32 and 33.

Figure 2:
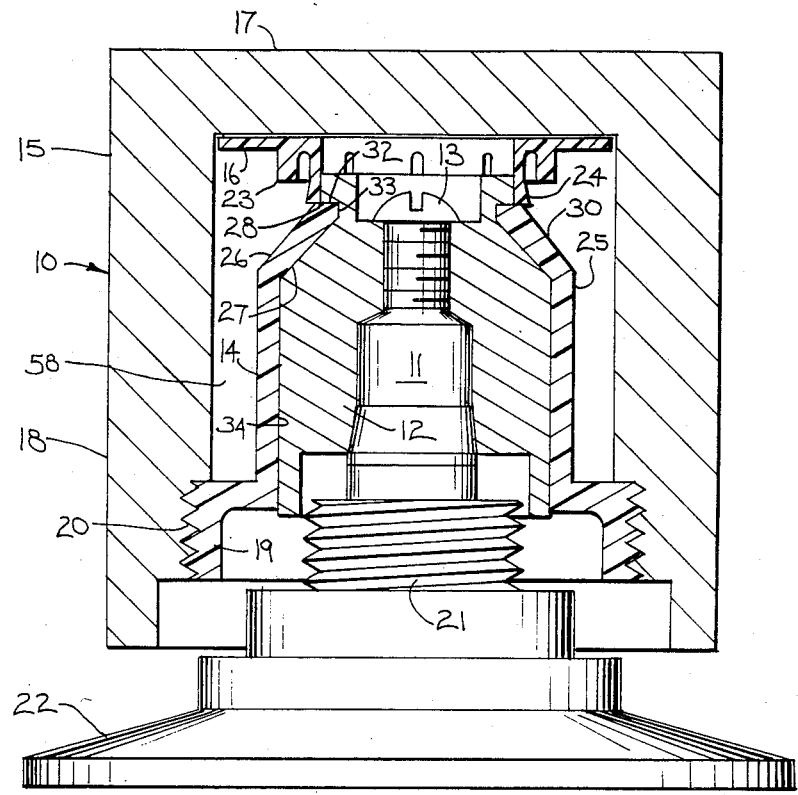
FIG. 2 is a view similar to FIG. 1, but with the handle in the assembled condition.
Figure 6:
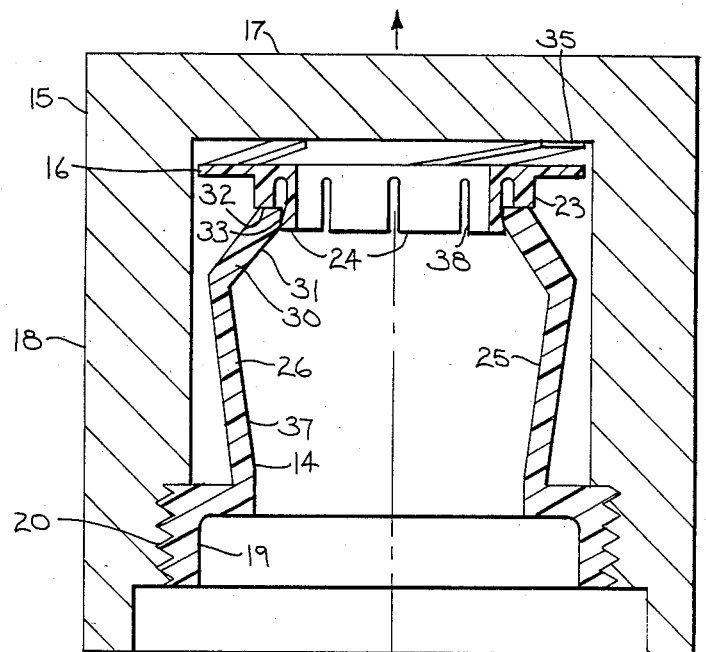
FIG. 6 is an exploded cross sectional view of the assembly.
Figure 6:
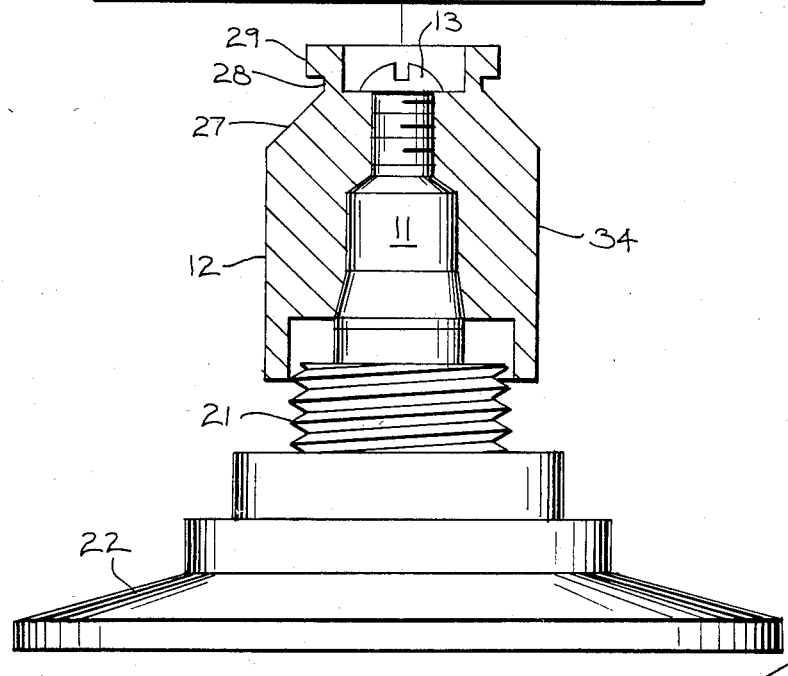

Referring specifically now to FIG. 6, it will be seen that the stem adapter 12 has a cam shoulder 27 and an adjacent contiguous undercut catch portion 28. These portions are formed from a continuous surface on the stem adapter 12. Extending from the shoulder 27 in a direction opposite to the undercut portion 28 is a flat hexagonal surface 34 (see FIG. 13) for contact with the inside and flat hexagonal surfaces 37 of the resilient fingers 25 and 26 (see FIG. 6 and 12) when they are allowed to be seated thereon in an unstressed condition such as indicated in FIG. 2.

Figure 10:
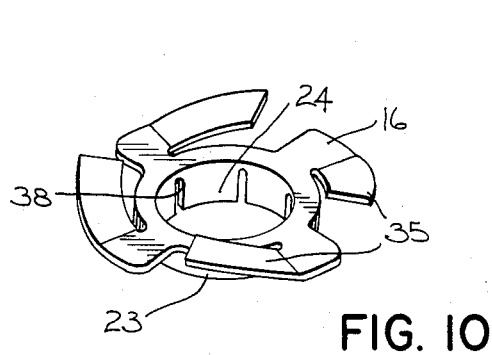
FIG. 10 is a top perspective view of a retainer member which is a component of the valve handle assembly.

Referring next to FIG. 10, the retainer 16 is shown therein in detail. In includes upwardly extending spring leaf portions 35 which will not only assist in the attachment of the retainer to the inside and top end portion 17 of the handle 15, but will also effect a downward biasing of the retainer on the resilient finger members 25 and 26. In an alternative embodiment, the leaf spring could be a separate part (rather than being integral with the retaining member). It will be noted that the engaging portion 24 is divided by the slots 38 to preferably result in eight resilient segments for contact with the end portions 30 of the six resilient fingers of the handle adapter 14.

FIG. 11 illustrates the preferred handle adapter 14 in detail. There is shown the six resilient finger portions 25, 25A, 25B, 26, 26A and 26B separated by the slots 39. It will be noted that these finger portions have a generally "L" shaped configuration with end portions 30.

Figure 9:
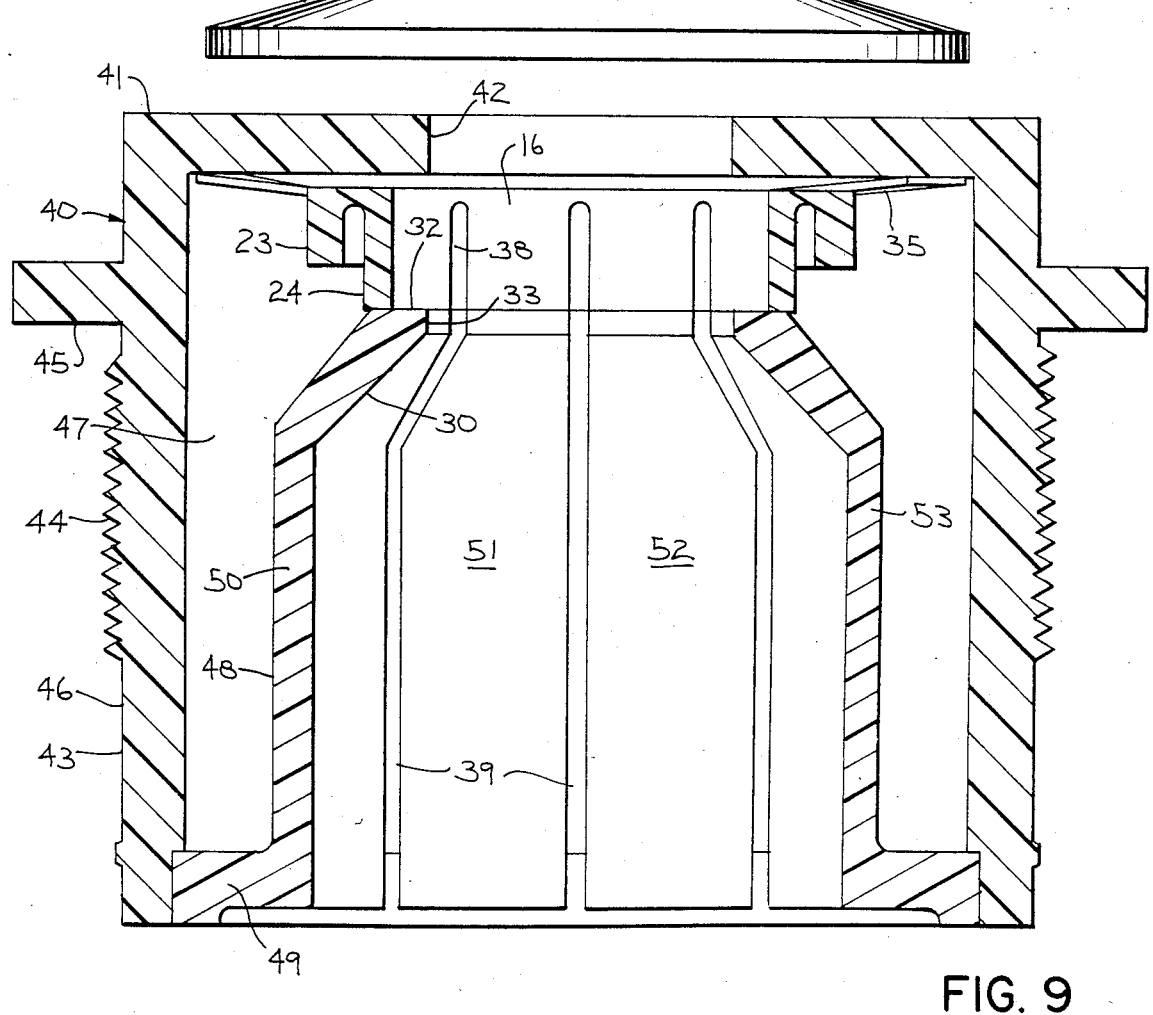
FIG. 9 is a view in vertical section of an alternative embodiment of a portion of the valve handle assembly of this invention.

Referring to the alternative embodiment generally (40) shown in FIG. 9, there is a handle 46 which has an end portion 41 with an opening 42 therein. It will include a skirt portion 43 providing a cavity 47 with the skirt portion 43 having external threads 44. A flange member 45 extends from the skirt 43. In this particular embodiment, the handle adapter 48 will have an annular flange 49 for connection with the skirt 43. In this instance it will be preferably a sonic weld attachment (rather than a threaded attachment as indicated for the flange 19 in the previous embodiment 10). Similar to the previous embodiment, there are six resilient finger members, four of which are shown at 50, 51, 52 and 53. Note the end portions 30 with the end surfaces 32 and 33 which will contact in one stage the engaging portion 24 of the retainer 16. It should be noted that the inner engaging portion 24 of the retainer 16 has a longer dimension and a width less than the outer engaging portion 23.

Figure 12:
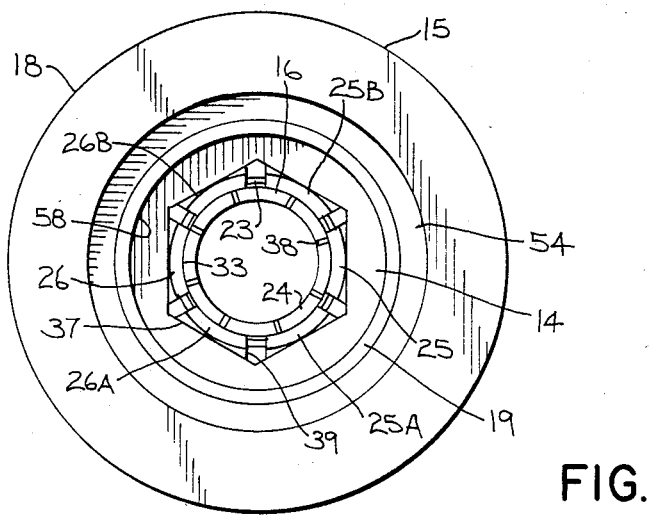
FIG. 12 is a bottom plan view of the handle with the retainer member and the handle adapter assembled therein and in the position shown in FIG. 7.
Figure 13:
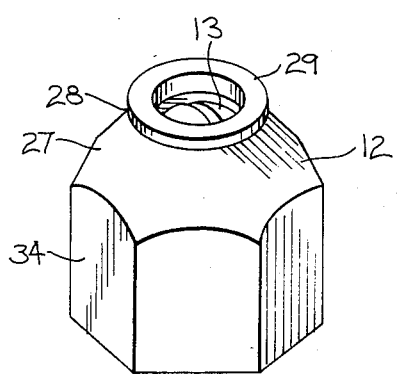
FIG. 13 is a top perspective view of the stem adapter employed with the handle assembly of this invention.
Figure 14:
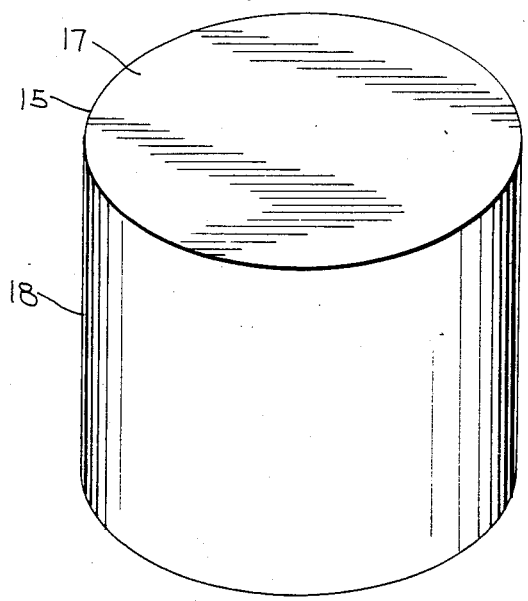
FIG. 14 is a top perspective view of the handle of the handle assembly.

Referring to FIG. 12, the handle 15 has a cavity 58 inside the skirt 18, and is circumscribed by the annular instep portion 54 to receive the handle adapter 14. The six resilient fingers 25, 25A, 25B, 26, 26A, and 26B have flat wall surfaces 37 which collectively are hexagonal in shape. As previously explained, these resilient fingers have surfaces 33 which are arcuate in shape and extend from end portions 30 for contact in one instance with the outer surfaces of the engaging portion 24 of the retainer 16 and in another instance with the undercut 28. As best seen in FIG. 14, the handle 15 is of the decorative type.

OPERATION

A better understanding of the structure of the valve handle assembly of this invention will be had by a description of its assembly and operation. To assemble the handle assembly 10, the retaining member 16 is placed in the handle bore 58 and then the handle adapter 14 is screwed into place. (See FIG. 1) The end portions 30 of the resilient finger members 25, 25A, 25B, 26, 26A and 26B will then be positioned so that the end surfaces 32 of these flexible fingers are in contact with the finger engaging portion 24. It should be particularly noted that the end portion 30 of the resilient fingers will extend above the annular portion 29 of the stem adapter. This is best seen in FIG. 1.

Figure 1:
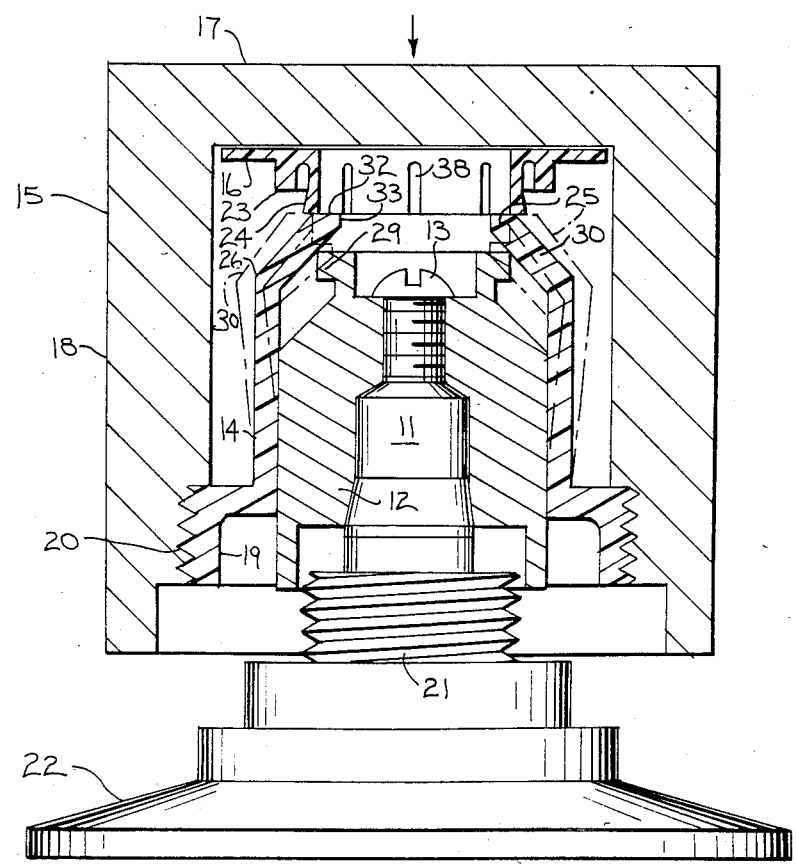
FIG. 1 is a view in vertical section showing the valve handle assembly of this invention during assembly.

Movement of the cap 15 in the direction of the valve stem 11 as shown in FIG. 1 will cause the finger end portions 30 to move downwardly, outwardly, and then inwardly over the annular portion 29 (in a manner partly indicated by the broken line showing the end portions 30 in FIG. 1). This movement of the cap will continue until the end surfaces 32 and 33 slip outside of the annular portion 29 and then are seated in the undercut portion 28 as indicated in FIG. 2.

In this position, the handle adapter 14 will be seated over the valve stem adapter 12 with the wall surface 31 of the end portions 30 of the resilient fingers also contacting the angular shoulder 27. The flat surfaces 37 of the fingers will then be contacting the hexagonal surfaces 34 of the handle adapter 12. Because the inside surfaces 37 of the handle adapter 14 and the outside periphery 34 of the stem adapter 12 are non-circular (and preferably hexagonal), a rotation of the handle 15 and the handle adapter 14 will also effect a rotation of the stem adapter 12. Thus, simple vertical movement of the handle mounts the handle.

Figure 3:
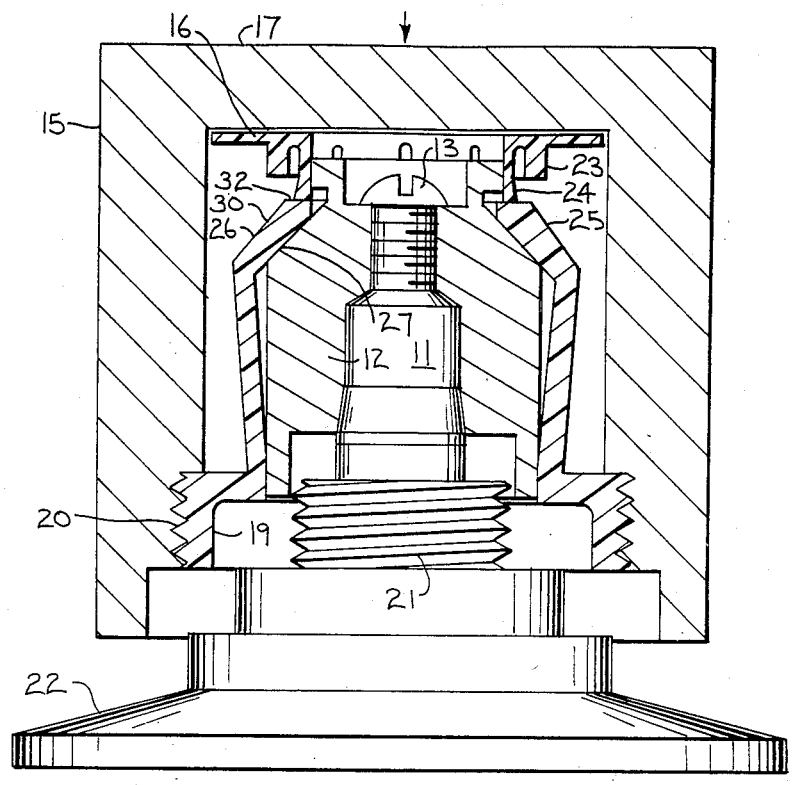
FIG. 3 is a view similar to FIG. 1, except showing the valve handle assembly in its initial stages of removal.
Figure 5:
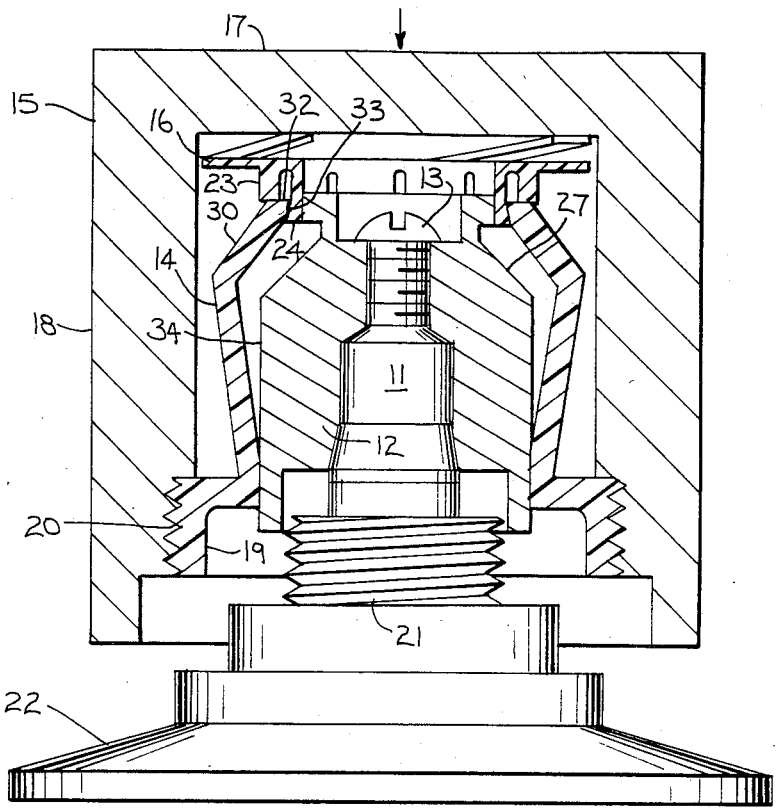
FIG. 5 is a view similar to FIG. 1, showing a further step in the removal of the valve handle assembly.

When it is desired to remove the handle 15 from the stem adapter 12, one first makes a continued inward linear movement of the handle in the direction of the valve stem. This sequence of motion is shown in FIGS. 3, 4, and 5. As best seen in FIG. 3, the engaging portion 24 will contact the end surfaces 32 of the flexible fingers such as 25 and 26. Continued motion will cause the end portions 30 to slide down over the shoulder portion 27 until the end surfaces 33 of the end portions 30 (due to their resiliency) will be released from under the catch 28 and will ride out against the outside wall portion 36 of the engaging portion 24. The downward bias of the retaining means 16 assists in this, as best shown in FIG. 4.

Figure 7:
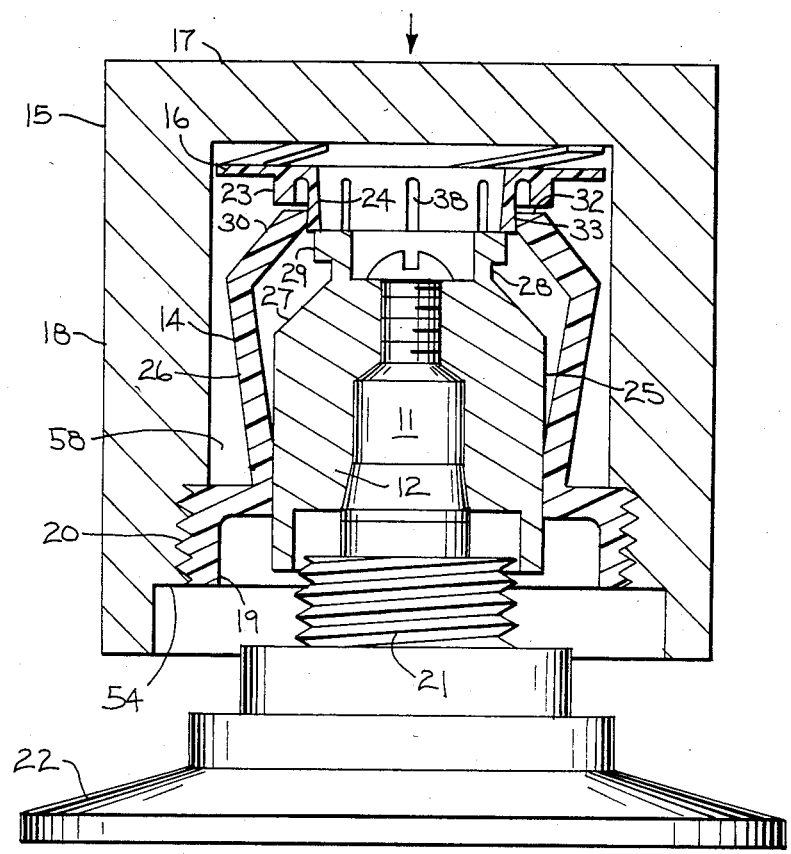
FIG. 7 is a view similar to FIG. 5, but with the handle about to be repositioned on the stem.

Continued movement of the handle 15 in the direction of the valve stem 11 will subsequently place the end surfaces 32 and 33 against the engaging portions 23 and 24 as illustrated in FIG. 5. It will be noted that in this position the end portions 30 are flexed to a large degree away from the stem adapter 12. In this position, the handle adapter 14 can be readily removed from the valve stem adapter 12 by simple upward movement of the handle 15 away from the valve stem 11. As best seen in FIGS. 6 and 7, when this is done the fingers 25, 25A, 25B, 26, 26A and 26B then compress the ring 24 inward.

In order to replace the handle adapter 14 over the stem adapter 12, it will be noted that the end portions 30 of the flexible fingers will be in a position above the end of the engaging portion 24 as indicated in FIG. 7. In this position the segments of the engaging portions 24 of the retainer 16 have been compressed so that they can now rest on the top of the stem adapter 12. Downward movement of the handle 15 will therefore strip the end portions 30 from the retainer 16 while compressing the engaging portions 24.

Figure 8:
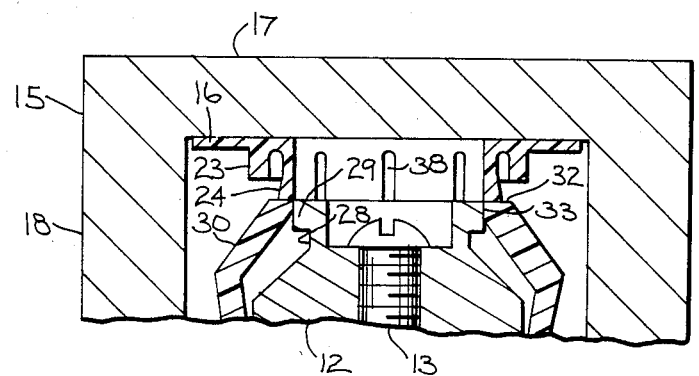
FIG. 8 is a view similar to FIG. 7, but with the handle in a further stage of replacement.

When the end portions 30 have moved below the bottom of engaging portions 24, the engaging portions 24 will return to their unbiased condition. This allows the engaging portions 24 to slide over the annular portion 29 of the stem adapter 12. This is best seen in FIG. 8. The end portions 30 slide down until they clear the annular stem portion 29 and engage undercut 28. The assembly is now in the position illustrated in FIG. 2 for initial installation. For removal of the assembly, the previous sequence of steps illustrated in FIGS. 3-5 is repeated.

The embodiment 40 shown in FIG. 9 with the handle 40 and the resilient fingers 50-53 will operate in the same manner as previously indicated for the placement of the handle 15 and the handle adapter 14. The only difference would be in the method of fabrication in that instead of the handle adapter 14 being threadably received in the handle 15 as in the embodiment 10, the flange 49 will be sonically sealed to the skirt 43 of the handle 46.

Accordingly, no rotation of the handles is required for placement or removal of the handles with respect to the valve stem 11. This is accomplished in a decorative type handle wherein the usual screw 13 for attaching the stem adapter 12 to the valve stem 11 is hidden from sight, yet is readily accessible after removal of the handles 15, 46 in the previously described manner.

The decorative handles 15 and 46 are preferably formed from a wood or nylon material. If desired, other types of materials such as metals could be employed. While in the preferred embodiment, a multiplicity of flexible finger portions such as 25, 25A, 26, and 26A are utilized, any number of such flexible fingers could be employed (with as few as one). The preferred material for fabricating the handle adapters 14 or 48 and the respective finger portions as well as the retainer 16 is a plastic material. However, other suitable materials could be employed as long as they provide a suitable flexing action.

Inner engaging portion 24 has been described for use with outer engaging portion 23 in conjunction with end portions 30 of the flexible fingers. If desired, outer engaging portion 23 could be eliminated with the inside wall surface of the retainer 16 serving as an alternative engaging surface. Whereas engaging portion 24 has been illustrated with slots 38 and divided into eight resilient segments, any number of such segments could be employed.

It will thus be seen that there is now provided an improved valve handle assembly for attaching a decorative handle to a rotatable stem such as a valve stem. The assembly is simple in its construction, yet is solid and not susceptible to being broken. A small number of parts are utilized in constructing the valve assembly, resulting in an inexpensive valve assembly construction. Also, a quick and efficient method for removing the handle is afforded in that simple linear action is all that is required to fix the handle on the valve stem, remove it therefrom, and reinstall it.

While certain preferred embodiments have been described above, it is readily apparent to those skilled in the art that a number of other modifications and changes can be made without departing from the spirit and scope of the invention. Therefore, it is intended that the scope of the invention should not be limited by the description of the preferred embodiments, but only by the claims which follow.

I claim:

1. A handle assembly for attachment to a rotatable stem, comprising;
   a stem adapter suitable to fit over the stem and be fixed axially relative thereto to rotate therewith;
   a handle adapter mounted over said stem adapter for rotation therewith;
   a handle mounted over said handle adapter;
   said handle adapter being axially fixed relative to said handle;
   a retaining member mounted between said handle and said handle adapter, said retaining member being inwardly resiliently biased towards said stem adapter; and
   means for resilient camming engagement between said handle adapter, stem adapter and retaining member whereby the handle may be fixed against outward movement relative to the stem adapter and then unfixed against outward movement relative to the stem adapter by sequential inward movement of the handle to a locking position, followed by further inward movement of the handle to a releasing position, followed by outward movement of the handle to remove it from the stem adapter.

2. A handle assembly which can be attached and detached from a rotatable stem by axial movement of the handle along the axis of the stem, comprising:
   a stem adapter suitable to fit over the stem so as to be fixed axially relative thereto and rotate therewith, said stem adapter having a peripheral cam surface and an undercut catch portion;
   a handle adapter constructed and arranged to fit over said stem adapter, said handle adapter defining at least one resilient finger member with a portion adapted to engage said cam surface and said undercut catch portions of said stem adapter;
   a handle member;
   a retainer member;
   said handle adapter and said retainer member being mounted in said handle member;

said retainer member having a resilient engaging member, said engaging member being constructed and arranged so that in conjunction with said stem adapter it can hold said resilient finger member out away from said stem adapter undercut catch portion when said handle member is in one position, permit placement of said finger member in said undercut portion in another position of said handle, and move the finger portion away from the catch portion in a third position.

3. The handle assembly of claim 2 wherein the stem is a plumbing valve control stem.

4. The handle assembly in accordance with claim 3, wherein said resilient engaging member is defined by a plurality of resilient engaging segments that can flex inwardly.

5. The handle assembly in accordance with claim 4, wherein said cam surface is an angled peripheral shoulder surface.

6. The handle assembly in accordance with claim 2, wherein a plurality of said resilient finger members are part of the handle adapter, and are generally L-shaped members.

7. The handle assembly in accordance with claim 2, wherein said handle member is of a generally U-shaped downwardly open configuration, and said handle adapter includes a flange member that attaches to said handle member to connect it to said handle member.

8. The handle assembly in accordance with claim 7, wherein said handle member is threaded to said handle adapter.

9. The handle assembly in accordance with claim 2, wherein the retainer member is resiliently biased in the downward direction.

10. A handle unit which can be attached and detached from a rotatable stem, said handle adapted to be used in conjunction with a stem adapter which fits over said stem and is fixed axially relative thereto to rotate therewith, the stem adapter having an angled shoulder surface and an undercut portion spaced therefrom, said handle unit comprising:
a handle adapter constructed and arranged to fit over said stem adapter, said handle adapter defining at least one resilient finger member adapted to engage both said angled shoulder and undercut portion of said stem adapter;
a handle member;
a retainer member;
said handle adapter and said retainer member mounted in said handle member to rotate therewith;
said retainer member having a resilient finger engaging portion, said resilient finger member being constructed and arranged so that in conjunction with said stem adapter it can hold said resilient finger member away from said stem adapter when said handle member is in one position, permit placement of said finger member in said undercut portion and in engagement with said shoulder surface in another position, move the finger member away from the said undercut portion in a third position, and also permit the retainer member to abut against the said stem adapter in yet another position.

11. The handle unit in accordance with claim 10, wherein said resilient finger engaging portions are defined by concentrically positioned annular members, with said inner annular member defining a plurality of flexible segments.

12. The handle unit in accordance with claim 11, wherein said stem adapter is constructed and arranged to fit over a valve stem.

13. The handle unit in accordance with claim 10, wherein said angled shoulder surface and said undercut portions are positioned contiguous to each other.

14. The handle unit in accordance with claim 10, wherein a plurality of said resilient finger members are part of the handle adapter, and are generally L-shaped members.

15. The handle unit in accordance with claim 14, wherein said resilient finger member portions are defined by surfaces matching said shoulder and said undercut portions.

16. The handle unit in accordance with claim 15, wherein said handle member is of a generally U-shaped configuration, and said handle adapter includes a flange member for connection with said handle member.

17. The handle unit in accordance with claim 16, wherein said handle member further includes an external threaded portion on the skirt thereof.

18. The handle unit in accordance with claim 10, wherein said retainer member includes spring leaf portions extending therefrom for contact with the inside of said handle member.

19. The valve handle unit in accordance with claim 11, wherein said concentrically positioned annular members are defined by an inner annular member having longer dimension than said outer annular member.

* * * * *